(12) United States Patent
Gopshtein et al.

(10) Patent No.: US 8,176,000 B2
(45) Date of Patent: May 8, 2012

(54) METHODS AND APPARATUS FOR DISCOVERING TRAFFIC ON A NETWORK

(75) Inventors: Michael Gopshtein, Yehud (IL); Eyal Kenigsberg, Dolev (IL); Nick Ioffe, Bat Yam (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 488 days.

(21) Appl. No.: 12/468,676

(22) Filed: May 19, 2009

(65) Prior Publication Data
US 2010/0299302 A1    Nov. 25, 2010

(51) Int. Cl.
*G06F 9/44* (2006.01)
*G06N 7/02* (2006.01)
*G06N 7/06* (2006.01)

(52) U.S. Cl. ........................................................ 706/52

(58) Field of Classification Search ........................ None
See application file for complete search history.

(56) References Cited

U.S. PATENT DOCUMENTS

2008/0262991 A1* 10/2008 Kapoor et al. ................. 706/20
2010/0074112 A1*  3/2010 Derr et al. ..................... 370/232

OTHER PUBLICATIONS

Kim et al. "A Flow-based Method for Abnormal Network Traffic Detection", IEEE, 2004, pp. 599-612.*
Holger Dreger et al., "Dynamic Application-Layer Protocol Analysis for Network Intrusion Detection", 15th USENIX Security Symposium, 2006, p. 257-272, Vancouver, B.C., Canada.

* cited by examiner

*Primary Examiner* — Jeffrey A Gaffin
*Assistant Examiner* — Li-Wu Chang

(57) ABSTRACT

Discovering communication traffic in a computer network is useful to administrators of computer networks. Communication packets from a communication transaction on the network are read to determine a source computing device and to determine whether the communication transaction contains a data pattern match to one of a plurality of defined data patterns. If a match is made to an exact data pattern, the source computing device is associated with an application or service corresponding to that exact data pattern. If a match is made to a statistical data pattern, the source computing device is associated with an application or service corresponding to that statistical data pattern if a threshold number of data pattern matches have occurred for that statistical data pattern for the source computing device.

20 Claims, 3 Drawing Sheets

METHODS AND APPARATUS FOR DISCOVERING TRAFFIC ON A NETWORK

BACKGROUND

Typical enterprise networks contain a large variety of application and service traffic. It is often useful to know what traffic is flowing across the network, such as for application monitoring systems, network intrusion detection systems and network management tools. However, in many situations, network administrators or others responsible for, or otherwise interested in, monitoring specific applications or services lack knowledge of the exact network location, e.g., IP addresses or port ranges, where such applications or services occur on the network. Configuration of traffic monitoring applications may require such knowledge to effectively monitor the desired traffic.

For the reasons stated above, and for other reasons that will become apparent to those skilled in the art upon reading and understanding the present specification, there is a need in the art for alternative methods and apparatus for discovering network traffic.

DETAILED DESCRIPTION

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process or mechanical changes may be made without departing from the scope of the present disclosure. The following detailed description is, therefore, not to be taken in a limiting sense, and the scope of the present disclosure is defined by the appended claims and equivalents thereof.

The various embodiments include methods of discovering communication traffic in a computer network and apparatus to perform the methods. These methods include looking at general communications occurring between servers or other computing devices. The communication packets during connection initialization will generally contain information identifying the application or service responsible for generating the connection request. However, reliance on connection initialization requires observing network traffic at specific times. In the various embodiments, traffic can be monitored during general communications, after connections have been established. Discovery is accomplished by identifying data patterns generated repeatedly by particular applications or services during normal transactions between two computing devices that are generally not commonly found in other applications or services. In this manner, a statistical approach can be taken to correlate a specific network traffic with a specific application or service.

The various embodiments address a number of difficulties with prior solutions. Port-number based solutions fail to correctly identify traffic on non-standard ports, which may be a significant portion of overall traffic. Pattern-only based systems do not cover all ranges of applications. For example, some applications may communicate using proprietary protocols or non-standard compression, such that traffic cannot be easily identified with plain-text patterns. In addition, many solutions rely on explicit knowledge of which of the communicating parties is a client or recipient computing device, and which is a server or source computing device, based on handshake packets for initialization of a connection. If traffic discovery is activated for only a short period of time, these handshake packets may not occur, and such traffic might go undiscovered.

Figure 1:
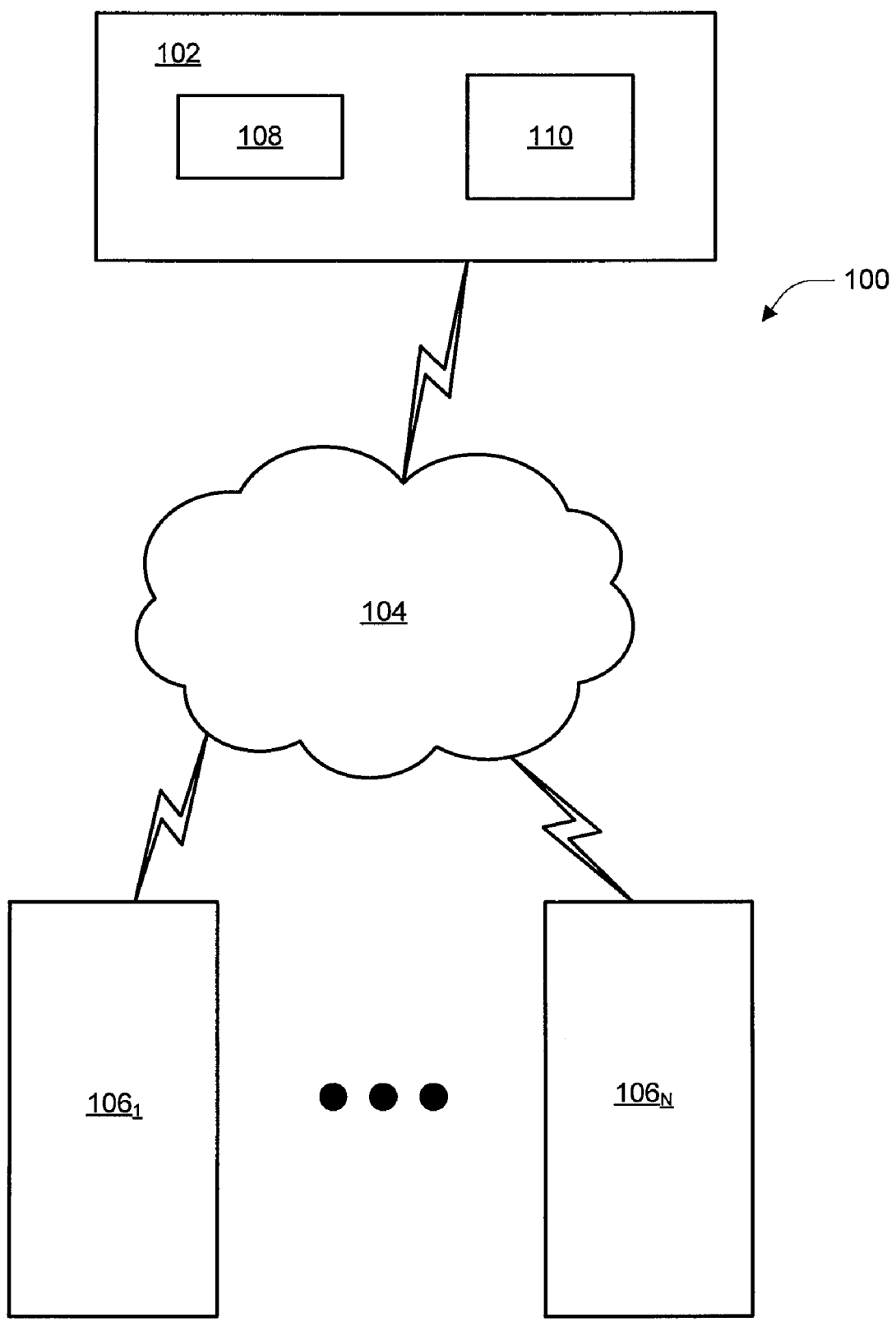
FIG. 1 is a representation of a computer system for use with various embodiments of the disclosure.

FIG. 1 is a representation of a computer system 100 for use with various embodiments of the disclosure. The computer system 100 includes a host device 102 in communication with a network 104, and one or more remote devices 106 in communication with the network 104. The network 104 may represent the Internet, a local area network (LAN), a wide area network (WAN) or any other type of network providing for communication between multiple electronic devices. The network 104 may further represent some combination of various network types.

The host device 102 is a computing device including a processor 108 and a storage medium 110. The storage medium 110 contains machine-readable instructions adapted to cause the processor 108 to perform one or more methods in accordance with embodiments of the disclosure. The host device 102 may represent a server computer usable by an administrator of the computer system to monitor network traffic of the computer system. Network traffic between various devices, e.g., between host device 102 and a remote device 106, or between two remote devices 106, generally consists of a transfer of communication packets between two devices.

Figure 2:
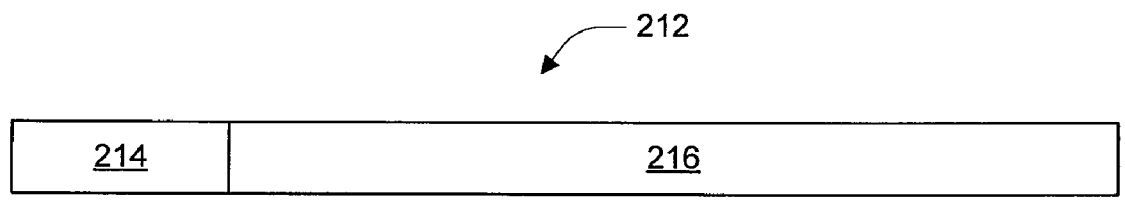
FIG. 2 is an example of a communication packet as might be used with various embodiments of the disclosure.

FIG. 2 is an example of a communication packet 212 as might be used with various embodiments of the disclosure. The communication packet 212 includes a header portion 214 and a payload or data portion 216. The header portion 214 contains information identifying the computing device responsible for generating the communication packet 212 and information identifying the intended recipient computing device, as well as other overhead information related to processing of the communication packet 212. For example, the header portion 214 may contain a source address and a destination address of the communication packet 212. For example, the source address may be the media access control (MAC) address of the computing device that generated the communication packet 212. Typically, the MAC address is the address of the network interface card (NIC) installed in the source computing device.

Figure 3:
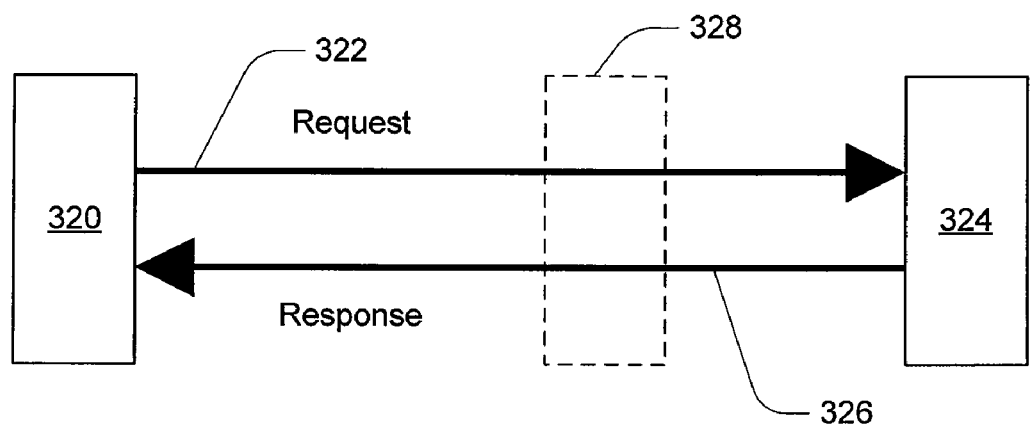
FIG. 3 is an example of request/response pair as might be used with various embodiments of the disclosure.

In a communication transaction between two computing devices, a request/response pair of communication packets is utilized. FIG. 3 is an example of request/response pair as might be used with various embodiments of the disclosure. In a communication transaction, a server or source computing device 320, i.e., the computing device responsible for generating the request communication packet 322, places the request communication packet 322 on the network. The intended recipient, or the client or destination computing device 324 will generate a response communication packet 326 in response to the request communication packet 322 and place the response communication packet 326 on the network. The computing device acting as the server, i.e., the computing device running the application or service that is intended for discovery, will be referred to as a source computing device even though it is receiving communication packets as well. Likewise, a client computing device will be referred to as a destination computing device even though it is sending communication packets as well.

A network sniffer 328 may be used by a host device (not shown in FIG. 3) to read the information of the request communication packet 322 and the response communication packet 326, from both the header portion and the data portion. This information will identify from what computing device the communication packet originated, and will contain data patterns that can be used to discover network traffic. To discover network traffic, as that term is used herein, is to associate a specific application or service with a specific source computing device.

To discover network traffic in accordance with various embodiments, known network traffic is first monitored to observe the communication packets generated for a particular application or service, both request and response. By looking at the content of these communication packets from known network traffic, data patterns can be located that are repeated across multiple communication transactions for that application or service. Data patterns are specific character patterns, hexadecimal patterns, binary patterns or the like contained within one or both communication packets of a transaction. Data patterns that appear in higher percentages of communication packets or transactions for a particular application or service are better candidates for discovering network traffic. In addition, data patterns for identifying a particular application or service should be chosen such that they do not appear as often in other applications or services of interest.

For various embodiments, two classes of data patterns are utilized. A first class of data patterns are data patterns that are deemed to be unique to a specific application or service. For this class of data patterns, a communication packet or transaction is deemed to be associated with a specific application or service if a single communication packet or transaction contains the data pattern. This class of data patterns will be called exact data patterns. Exact data patterns would generally be those data patterns that have a high likelihood of occurring during a communication transaction of the specific application or service, and a low likelihood of occurring during a communication transaction of other applications or services of interest. It is noted that other applications or services might generate such a data pattern within their communication transactions, but that the probability is low enough that an error in identification is considered acceptable.

A second class of data patterns are data patterns that would be deemed to identify a specific application or service if they were to occur in a particular threshold number of communication packets or transactions between two computing devices. Unlike exact data patterns, the threshold number is greater than one. This class of data patterns will be called statistical data patterns. Statistical data patterns would generally be those data patterns that have a relatively high likelihood of occurring during a communication transaction of the specific application or service, and a relatively low likelihood of occurring during a communication transaction of other applications or services of interest.

The difference between exact data patterns and statistical data patterns is generally subjective, but, objectively, the probability associated with an exact data pattern occurring in a communication transaction of its corresponding application or service is higher than the probability associated with a statistical data pattern occurring in a communication transaction of its corresponding application or service. By observing known communication transactions from applications or services of interest, the observer can generate the statistical probability that a given data pattern of a single communication transaction would correctly identify its corresponding application or service, or the statistical probability that a given data pattern occurring in a threshold number of communication transactions in a particular sample of communication transactions would correctly identify their corresponding application or service. The particular sample of communication transactions may be based on time, e.g., those communication transactions occurring in 10 seconds, or the particular sample of communication transactions may be simply a defined number of analyzed communication transactions. Generally, embodiments described herein will more accurately discover network traffic if data patterns associated with higher statistical probabilities of correct identification are selected. However, the embodiments are not limited by a specific statistical probability being selected.

Applicant has observed known network traffic and has identified data patterns occurring in communication transactions, either in the request or the request/response pair, that might be used in the various embodiments. Table 1 lists example data patterns and their corresponding application or service. Table 1 further identifies whether Applicant deemed the data pattern to be exact or statistical.

TABLE 1

Data Patterns and Corresponding Applications/Services

| Application/ Service | Response Data Pattern | Request Data Pattern | Class of Data Pattern |
|---|---|---|---|
| Citrix-ica | | ......%49%43%41 | Exact |
| LDAP | | %30.{3,6}%02 # | Statistical |
| Oracle Database | %..%..%00%00% 06%00 | %..%..%00%00%06 %00 | Statistical |
| Microsoft SQL Server | %04%0[0\|1].{15} %00 | %0[1\|3]%0[0\|1].{15} %00 | Statistical |
| Java RMI | | %4A%52%4D%49.* | Exact |
| Java RMI | | %47%49%4F%50.* | Exact |
| FTP | | (CWD\s\|CDUP\s\| STOR\s\|RMD\s\|MKD\s\| PWD\s\|RNFR\s\|PACV\s) | Exact |
| FTP | | (RETR\s\|USER\s\| PASS\s\|ACCT\s) | Statistical |
| POP3 | \+OK.*POP3 | | Exact |
| POP3 | (\+OK\|\-ERR) | | Statistical |
| SMTP | 220 .*SMTP | | Exact |

TABLE 1-continued

Data Patterns and Corresponding Applications/Services

| Application/Service | Response Data Pattern | Request Data Pattern | Class of Data Pattern |
|---|---|---|---|
| SMTP | | (HELO|DATA|MAIL FROM:|RCPT TO:|) | Statistical |
| IMAP | \*\s.{0,3}(CAPABILITY \sIMAP|\d{0,3}\sFETCH) | | Exact |
| IMAP | \*\sLIST | | Statistical |

As is shown in Table 1, the same application or service might be discovered using more than one class of data pattern. For example, the data pattern "220.*SMTP" occurring in the response communication packet is deemed to be an exact data pattern for discovery of the SMTP service, while the data pattern "(HELO|DATA|MAIL FROM:|RCPT TO:|)" occurring in the request communication packet is deemed to be a statistical data pattern for discovery of the SMTP service. And while not shown in Table 1, a statistical data pattern for an application or service may be deemed an exact data pattern if received on a specific port. The analysis is similar to the examples above that are not port-specific, i.e., by observing known communication transactions from applications or services of interest, the observer can generate the statistical probability that a given data pattern of a single communication transaction received at a specific port would correctly identify its corresponding application or service. For example, the statistical data pattern for discovery of the FTP service may be deemed to be an exact data pattern if the request communication packet is received at port 21, the statistical data pattern for discovery of the POP3 service may be deemed to be an exact data pattern if the response communication packet is received at port 110, the statistical data pattern for discovery of the SMTP service may be deemed to be an exact data pattern if the request communication packet is received at port 25, and the statistical data pattern for discovery of the IMAP service may be deemed to be an exact data pattern if the response communication packet is received at port 143.

Not all applications or services occurring on a network need be analyzed for exact or statistical data patterns, i.e., it is not necessary to define a correspondence between each application or service that may occur on a network and one or more exact and/or statistical data patterns. In addition to the statistical approach of the embodiments of the disclosure, prior art methods of discovering network traffic may be used in conjunction with such embodiments. For example, if communication packets of a particular source computing device fail to match any data pattern of the plurality of defined data patterns being compared during a particular sample of communication transactions, an application or service could be assigned to communication transactions originating at that specific source computing device based upon what port is being used for those communication transactions. Furthermore, additional embodiments may ignore low-usage items, e.g., if a number of communication transactions is below some threshold level, or if a number of recipient computing devices is below some threshold level, that traffic might be ignored as insignificant.

Figure 4:
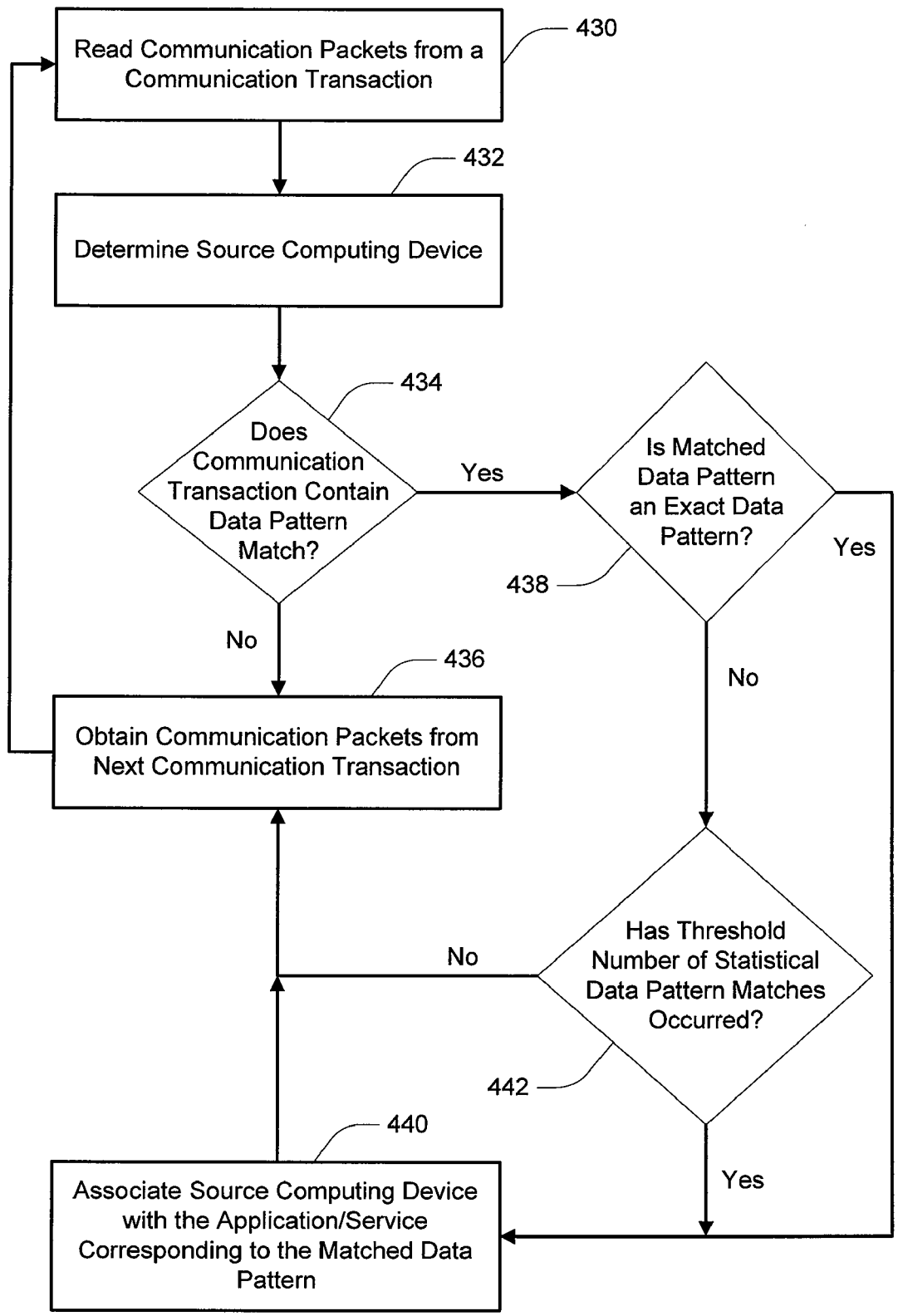
FIG. 4 is a flow chart of a method of discovering network traffic in accordance with an embodiment of the disclosure.

FIG. 4 is a flow chart of a method of discovering network traffic in accordance with an embodiment of the disclosure. In general, communication packets are read, such as through the use of a network sniffer, and compared to a defined plurality of data patterns. These communication packets are analyzed to determine a source computing device and to determine whether a communication packet contains a match for one of the defined data patterns. If a match is found for a defined data pattern that is an exact data pattern, the source computing device is identified to be running the application or service associated with that exact data pattern. If a match is found for a defined data pattern that is a statistical data pattern, the source computing device is identified to be running the application or service associated with that statistical data pattern if some threshold number of communication transactions match that statistical data pattern for that source computing device of some particular sample of communication transactions. For example, if 5 or more communication transactions from the source computing device match the statistical data pattern for those communication transactions occurring over a 10-second period, the source computing device could be identified to be running the application or service associated with that statistical data pattern.

At box 430, communication packets from a communication transaction are read. As noted before, this can be accomplished using a network traffic sniffer. At 432, the source computing device is determined. Determining the source computing device may include reading the source address contained in the header portion of a request communication packet of the communication transaction.

At 434, a determination is made as to whether the communication transaction contains a data pattern match. This may be accomplished by comparing a plurality of defined data patterns to the content of the request communication packet and/or the response communication packet of the communication transaction. The process proceeds to box 436 if no data pattern match is contained in the communication transaction to obtain communication packets from a next communication transaction. If a data pattern match is contained in the communication transaction at box 434, a determination is made at box 438 as to whether the matched data pattern is an exact data pattern. If the matched data pattern is an exact data pattern at box 438, the source computing device is deemed to be running the application or service corresponding to the matched exact data pattern, and the source computing device is associated with that corresponding application or service at box 440. If the matched data pattern is not an exact data pattern at box 438, i.e., it is a statistical data pattern, the process proceeds to box 442 to determine whether a threshold number of statistical data pattern matches has occurred at box 442. If a threshold number of statistical data pattern matches has not occurred at box 442, the process proceeds to box 436 to obtain communication packets from a next communication transaction. If a threshold number of statistical data pattern matches has occurred at box 442, the source computing device is deemed to be running the application or service corresponding to the matched statistical data pattern, and the source computing device is associated with that corresponding application or service at box 440.

Although specific embodiments have been illustrated and described herein it is manifestly intended that the scope of the claimed subject matter be limited only by the following claims and equivalents thereof.

What is claimed is:

1. A method of discovering traffic on a computer network, comprising:
   reading communication packets from a communication transaction on the network;
   determining a source computing device;
   determining whether the communication transaction contains a data pattern match to one of a plurality of defined data patterns; and
   if the communication transaction contains a data pattern match to a statistical data pattern of the plurality of defined data patterns, determining if a threshold number of data pattern matches have occurred for that statistical data pattern for the source computing device, and associating the source computing device with an application or service corresponding to that statistical data pattern if the threshold number of data pattern matches have occurred for that statistical data pattern for the source computing device;
   wherein the threshold number of data pattern matches is greater than one.

2. The method of claim 1, further comprising:
   if the communication transaction contains a data pattern match to an exact data pattern of the plurality of defined data patterns, associating the source computing device with an application or service corresponding to that exact data pattern.

3. The method of claim 1, wherein determining whether the communication transaction contains a data pattern match to one of a plurality of defined data patterns further comprises determining on what port the communication transaction occurred.

4. The method of claim 1, wherein the threshold number of data pattern matches is a particular number of data pattern matches to occur within communication transactions originating at the source computing device within a particular period.

5. The method of claim 1, wherein reading communication packets from a communication transaction on the network comprises reading communication packets with a network sniffer.

6. The method of claim 1, wherein determining whether the communication transaction contains a data pattern match to one of a plurality of defined data patterns comprises determining whether the communication transaction contains a data pattern match to one of a plurality of defined data patterns selected from the group consisting of specific character patterns, hexadecimal patterns and binary patterns.

7. The method of claim 1, wherein reading communication packets from a communication transaction on the network comprises reading communication packets not limited to handshake packets between two computing devices involved in the communication transaction.

8. The method of claim 1, further comprising:
   if the communication transaction does not contain a data pattern match to one of the plurality of defined data patterns, reading communication packets from a next communication transaction.

9. The method of claim 8, further comprising:
   if the communication transaction does not contain a data pattern match to one of the plurality of defined data patterns, associating the source computing device with an application or service corresponding to a port on which the communication transaction occurred.

10. The method of claim 1, wherein determining a source computing device comprises reading a header portion of a request communication packet of the communication transaction to obtain an address of the source computing device.

11. The method of claim 1, wherein determining whether the communication transaction contains a data pattern match to one of a plurality of defined data patterns comprises comparing content of a request communication packet of the communication transaction to one or more data patterns of the plurality of defined data patterns and/or comparing content of a response communication packet of the communication transaction to one or more data patterns of the plurality of defined data patterns.

12. A method of discovering traffic on a computer network, comprising:
   reading communication packets from a communication transaction on the network;
   determining a source computing device;
   determining whether the communication transaction contains a data pattern match to one of a plurality of defined data patterns; and
   if the communication transaction contains a data pattern match to a statistical data pattern of the plurality of defined data patterns, associating the source computing device with an application or service corresponding to that statistical data pattern if a threshold number of data pattern matches have occurred for that statistical data pattern for the source computing device;
   wherein associating the source computing device with an application or service comprises associating the source computing device with at least one application or service that corresponds to at least one statistical data pattern of the plurality of defined data patterns and that corresponds to at least one exact data pattern of the plurality of defined data patterns, and wherein associating the source computing device with that application or service occurs upon determining the first match to one of the exact data patterns corresponding to that application or service or upon determining that the threshold number of data pattern matches have occurred for one of the statistical data patterns corresponding to that application or service, whichever occurs first.

13. A computer system, comprising:
   a network; and
   two or more computing devices in communication through the network;
   wherein at least one of the computing devices comprises a processor and a storage medium containing machine-readable instructions adapted to cause the processor to perform a method of discovering traffic on the network, the method comprising:
      reading communication packets from a communication transaction on the network;
      determining a source computing device of the two or more computing devices;
      determining whether the communication transaction contains a data pattern match to one of a plurality of defined data patterns; and
      if the communication transaction contains a data pattern match to a statistical data pattern of the plurality of defined data patterns, determining if a threshold number of data pattern matches have occurred for that statistical data pattern for the source computing device, and associating the source computing device with an application or service corresponding to that statistical data pattern if the threshold number of data pattern matches have occurred for that statistical data pattern for the source computing device;

wherein the threshold number of data pattern matches is greater than one.

14. The computer system of claim 13, wherein the method further comprises:

if the communication transaction contains a data pattern match to an exact data pattern of the plurality of defined data patterns, associating the source computing device with an application or service corresponding to that exact data pattern.

15. The computer system of claim 13, wherein, in the method, determining whether the communication transaction contains a data pattern match to one of a plurality of defined data patterns further comprises determining on what port the communication transaction occurred.

16. The computer system of claim 15, wherein the method further comprises:

if the communication transaction does not contain a data pattern match to one of the plurality of defined data patterns, associating the source computing device with an application or service corresponding to a port on which the communication transaction occurred.

17. The computer system of claim 13, wherein, in the method, the threshold number of data pattern matches is a particular number of data pattern matches to occur within communication transactions originating at the source computing device within a particular period.

18. The computer system of claim 13, wherein, in the method, the threshold number of data pattern matches is a particular number of data pattern matches to occur within communication transactions originating at the source computing device within a particular number of analyzed communication transactions.

19. The computer system of claim 17, wherein, in the method, the communication transactions originating at the source computing device within the particular period have one or more destination computing devices.

20. The computer system of claim 13, wherein, in the method, determining a source computing device comprises reading a header portion of a request communication packet of the communication transaction to obtain an address of the source computing device.

* * * * *